United States Patent [19]

Somani et al.

[11] 3,906,107

[45] Sept. 16, 1975

[54] AMINOALKYL SULFATE ESTERS WITH DIURETIC ACTIVITY

[75] Inventors: Pitambar Somani, Libertyville; Donald Lyons Martin, Waukegan, both of Ill.

[73] Assignee: Abbott Laboratories, North Chicago, Ill.

[22] Filed: Sept. 8, 1972

[21] Appl. No.: 287,304

[52] U.S. Cl................................. 424/315; 260/458
[51] Int. Cl.²......................................... A61K 31/185
[58] Field of Search..................................... 424/315

[56] References Cited
UNITED STATES PATENTS

| | | | |
|---|---|---|---|
| 3,051,626 | 8/1962 | Rao.................................... | 424/315 |
| 3,133,950 | 5/1964 | Pizzarello et al. .................. | 260/458 |

OTHER PUBLICATIONS

Cherbuliez et al., Helv. Chem. Acta., 47, (7), 2106, (1964).

Dewey et al., J. Org. Chem., 30, 491, (1965).

Primary Examiner—Jerome D. Goldberg
Assistant Examiner—Daren M. Stephens
Attorney, Agent, or Firm—Paul D. Burgauer; Robert L. Niblack

[57] ABSTRACT

The present invention is directed to the provision of a therapeutically active composition having diuretic and renal vasodialator properties. The composition contains as its active ingredient a (substituted) aminoalkylsulfate ester. Such an ester is of extremely low toxicity and has a high therapeutic index.

10 Claims, No Drawings

AMINOALKYL SULFATE ESTERS WITH DIURETIC ACTIVITY

DETAILED DESCRIPTION OF THE INVENTION

The present invention is mainly directed to the treatment of various forms of edema and hypertension in warm-blooded animals and an anti-hypertensive composition. The anti-hypertensive compositin of the present invention, unlike other drugs used by physicians, also increases renal blood flow. This combination of effects represents a valuable new tool in the treatment of hypertension, renal vasoconstriction and insufficient sodium or potassium excretion.

It is thus an object of the present invention to provide a composition for treatment of hypertension in warm-blooded animals; it is another object of this invention to provide a composition for the treatment of insufficient renal blood flow; it is a further object of this invention to provide a medicinal composition in unit dosage form that is of low toxicity and high therapeutic value. It is still another object of this invention to provide a diuretic composition in unit dosage form that due to its extremely low toxicity virtually avoids all dangers of overdosing or toxic side effects.

These and other objects are accmplished by providing a medicinal composition consisting essentially of a compound of the formula

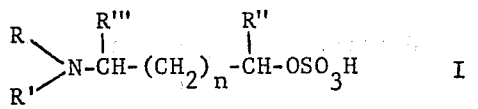

wherein R, R', R'' and R''' independently are hydrogen or methyl and $n$ is 0, 1 or 2, together with a pharmaceutical carrier. The term "pharmaceutical carrier" for the purpose of the present invention is intended to refer to any media that is suitable for the preparation of a unit dosage form and thus includes tableting media, a pharmaceutically acceptable solvent such as is ordinarily used in the preparation of intravenous or intramuscular solutions, i.e., water or saline buffered to a pH close to 7.

The above defined esters increase the urinary excretion in warm-blooded animals between 50 and 525% over normal urinary excretion. In this respect, compounds wherein $n$ is 0 or 1 and all substituents are hydrogen show the highest increase followed by the compound wherein R'' or R''' is methyl, R and R' are hydrogen and $n$ is 0 and, still less active are the compounds wherein R or R' are methyl and n is 1 or 2 with R'' and R''' being hydrogen, although these compounds still increase urinary excretion at least 50% over normal. Expressed differently, the compounds which are unsubstituted in the nitrogen function and have a straight alkyl chain between the two functional groups with $n$ being 0, 1 or 2 increase urinary excretion 160–525% over the norm whereas the compounds having substitution in the amino function or with a branched alkyl chain between the two functional groups shown above, show an increase of 50–90% of urinary excretion over the corresponding controls upon intravenous administration of 100 mg./kg.

Due to the extremely low toxicity of the above aminoalkyl sulfate esters, a pharmaceutical composition containing said ester can be administered without danger to warm-blooded animals in intravenous, intramuscular or oral dosage forms. For oral administration, amounts of 10–1000 mg./kg. are extremely useful, with a total dose of 2 g. per day being a suitable range for large animals including humans. The whole dosage range described increases total urinary excretion 1.5–6.2 fold in most animals; sodium and chloride excretion increase 1.2–4.7 fold, while potassium excretion increases to maximum of only 2.2 times the norm. In addition, urinary osmolality is reduced. From these figures it is apparent that the new diuretic composition reduces the possibility of an undesirable potassium depletion associated with previously used diuretics to a large extent.

One of the standard drugs used as diuretic anti-hypertensive in the past has been 2-methyl-3-chloromethyl-6-chloro-7-sulfamoyl-3,4-dihydro-1,2,4-benzothiadiazine-1,1-dioxide generically known and hereinafter referred to as methyclothiazide. The composition of the present invention acts physiologically similar to methyclothiazide and has several advantages thereover.

For oral dosage forms, the above defined sulfate esters can be placed in capsules or formulated into pills, wafers or tablets in the usual fashion together with pharmaceutical excipients well known in the art. Such tablets, pills and the like may be flavored with the usual flavoring agents and tablets may be prepared in various colors using the usual coloring agents and coating formulations known in the trade. Tablets may be prepared for immediate release of the active ester or they may be made enteric, i.e., whereby the active ingredient is released slowly over a period of several hours from within the intestinal tract. Chewable tablets may also be made using standard formulations and flavoring techniques.

In order to illustrate the properties of the above compositions, reference is made to the following examples which, however, are not meant to limit the invention in any respect.

EXAMPLE 1

Beagle dogs of both sexes weighing between 9 and 12 kg. were anesthesized with morphine sulfate (3 mg./kg., subcutaneously) followed 30 minutes later by barbital sodium (250 mg./kg., intravenously). The femoral artery was cannulated by a polyethylene catheter to record arterial blood pressure and to collect arterial blood samples for plasma electrolytes and inulin measurements. A femoral vein was also cannulated for continuous infusion of saline (0.9% solution, 0.6 ml./kg./min.). Both ureters were cannulated above the urinary bladder for collection of total urinary outflow.

The dogs were deprived of food and water for 12–18 hours prior to the experiment. Following the above surgical preparation of the animal, a continuous infusion of 0.9% saline was started and after the urine outflow had stablized during 10 minute collection periods (usually 10 to 30 minutes after surgery), a priming dose of inulin (35 mg./1.5 ml. saline/kg.) was injected. The sustaining dose of inulin was then infused intravenously in 0.9% saline at the rate of 1.1 mg./0.3 ml./kg./min. During the equilibrium period of 1 hour, urine samples were collected at 10 minute intervals and the volume was recorded. At the end of 1 hour, 3 consecutive "control" urine and blood samples were collected over 10 minute intervals. At the end of the collection of the last sample, the test drug was injected intravaneously and urine and blood samples were collected at 10 minute intervals and analyzed for inulin, sodium, potassium, chloride and osmolality. From these data, urine volume, glomerular filtration rate (from inulin clearance), sodium, potassium and chloride excretions were calculated by standard formula before (control) and after drug administration.

In Table I below, all variables are shown under the headings of "Dog" and "Compound". In all instances, the test dose was 100 mg./kg. administered intravenously.

flow probes around the artery by standard surgical procedures. It was observed that the renal blood flow increased from an average of 60–70 ml./min. before administration of the test compound to 120–130 ml./min. for a period of 90–150 minutes. This increase is almost 100%. The dogs also showed an increased urinary frequency. One dog received 100 mg./kg., the other 1.0 g./kg.

Because of the demonstrated diuretic and renal vasodilator property of this compound, it is also potentially useful in the treatment of congestive heart failure.

TABLE I

| Test Compound | | | | | Urine Volume+ | | Na+ Excretion* | | K+ Excretion* | | Cl-Excretion* | | Dog | |
| R | R' | R'' | R''' | n | Control | After | Control | After | Control | After | Control | After | Weight | Sex |
|---|---|---|---|---|---|---|---|---|---|---|---|---|---|---|
| Me | Me | H | H | 0 | 1.80 | 3.20 | 37.280 | 58.140 | 6.400 | 12.255 | 30.239 | 55.860 | 11.2 kg. | m |
| H | H | H | H | 1 | 1.22 | 3.70 | 25.359 | 55.404 | 2.354 | 5.184 | 18.511 | 56.700 | 11.4 kg. | f |
| Me | H | H | H | 0 | 1.96 | 2.90 | 35.739 | 44.450 | 4.617 | 5.334 | 34.371 | 41.656 | 11.4 kg. | f |
| H | H | H | H | 2 | 1.90 | 3.95 | 29.488 | 49.296 | 4.408 | 6.636 | 23.864 | 42.660 | 12.5 kg. | m |
| Me | Me | Me | H | 0 | 1.12 | 1.95 | 22.470 | 31.416 | 6.527 | 7.854 | 16.799 | 25.245 | 10.4 kg. | m |
| H | H | H | H | 0 | 1.75 | 11.00 | 33.936 | 149.10 | 7.392 | 14.700 | 31.080 | 145.95 | 10.4 kg. | m |
| H | H | Me | H | 0 | 0.73 | 1.90 | 16.380 | 30.176 | 4.970 | 7.544 | 10.780 | 29.992 | 10.3 kg. | m |
| H | H | H | Me | 0 | 1.30 | 4.50 | 22.060 | 54.245 | 3.055 | 7.045 | 19.205 | 57.680 | 9.8 | m |

*measured in mEq/kg./min.
+ml./min.

The above table clearly shows the drastic increase in urinary volume after the test drug was given intravenously. Similar results were obtained with the measurements of sodium, potassium and chlorine excretion rates.

EXAMPLE 2

An aqueous solution containing the compound of Formula I wherein R, R' and R'' are hydrogen and $n$ is 0 (2-aminoethylsulfate ester) was given orally to unanesthetized dogs where renal artery blood flow was measured by a chronic placement of electromagnetic

EXAMPLE 3

The dose dependency and high tolerance of the compound used in Example 2 was tested orally in rats weighing between 240 and 260 g. In each test group, four animals were used while the control group consisted of 8 animals. Each animal after being fasted 12 hours, was given 25 ml./kg. of saline containing the amount of drug indicated below, thus assuring that all animals, including the controls, received the same amount of salt and liquid. The results are shown in Table II.

TABLE II

| | Control | 100 mg./kg. | 300 mg./kg. | 1 g./kg. |
|---|---|---|---|---|
| Urine Vol. | | | | |
| 1 hour | 4 | 8 | 14 | 28 ml. |
| 5 hours | 12.5 | 15 | 15 | 32 ml. |
| 24 hours | 17.5 | 19 | 16 | 15 ml. |
| total | 34 | 42 | 45 | 75 ml./24 hrs |
| Cl excretion | | | | |
| 1 hour | 736 | 1480 | 2576 | 4648 mEq |
| 5 hours | 2813 | 3600 | 2835 | 4672 mEq |
| 24 hours | 2085 | 2090 | 816 | 510 mEq |
| total | 5634 | 7170 | 6227 | 9830 mEq/24 hrs |
| Na+ excretion | | | | |
| 1 hour | 624 | 1184 | 1960 | 3724 mEq* |
| 5 hours | 2209 | 2595 | 2100 | 3744 mEq |
| 24 hours | 2242 | 2289 | 1232 | 720 mEq |
| total | 5075 | 6068 | 5292 | 8188 mEq/24 hrs |
| K+ excretion | | | | |
| 1 hour | 664 | 664 | 728 | 1304 mEq* |
| 5 hours | 1412 | 1740 | 960 | 2016 mEq* |
| 24 hours | 2235 | 2223 | 2240 | 3135 mEq* |
| total | 4311 | 4627 | 3928 | 6455 mEq*/24 hrs |

The above measurements clearly show the increase of urinary excretion and the saluretic effect of the new diuretic compound; the experiment also shows the dose dependency of the new composition as well as the safety of the new compound since no toxic manifestations and no other untoward effects were noted in any of the animals of the test groups, although the animals of the 1 g./kg. dose group showed somewhat decreased activity, which could be due to a profound loss of water and electrolytes as would be expected from the pharmacological action of the compound.

EXAMPLE 4

The diuretic and saluretic effects of the compound shown in Example 2 was tested at several dose levels in dogs weighing between 10.4 and 14.5 kg. In each instance, the test was conducted as described in Example 1; the urine volume was collected individually from each dog in 10-minute intervals. The peak % increase in a particular test group (2 to 4 dogs per group) over a 10-minute period before drug administration to the same dogs in urine volume and ion excretion was recorded in Table III. All figures represent the peak % increase after drug administration; the dose is given in mg./kg.

TABLE III

|  | Dose of the Compound (mg./kg.) | | | | | | |
|---|---|---|---|---|---|---|---|
|  | 0 | 3 | 10 | 30 | 100 | 300 | 1000 |
| Urine Volume | 26 | 59 | 192 | 234 | 396 | 471 | 1972 |
| Na$^+$ excretion | 36 | 42 | 124 | 243 | 201 | 160 | 1247 |
| K$^+$ excretion | 23 | 27 | 58 | 158 | 76 | 80 | 2100 |
| Cl$^-$ excretion | 50 | 70 | 225 | 502 | 340 | 336 | 1150 |

The above table shows the close and linear dose/effect relationship that is desirable for a diuretic composition of the present nature.

The compounds of the present invention, as shown in Table I follow an interesting and distinct pattern: with increasing chain lengths between the two functional groups of the compound, activity as a diuretic agent decreases. In fact, compounds of Formula I but wherein $n \geq 3$ are antidiuretic compounds. At equal dose, the activity decreases with increased chain length but simultaneously, the toxicity of the compounds seemed to increase. In an effort to establish the LD$_{50}$ values, it was found that such values cannot be established at dosages up to 1000 mg./kg. orally or 1000 mg./kg. intraperitoneally with the exception of the compound wherein R, R', R'' and R''' all are hydrogen and $n$ is 2: its intraperitoneal LD$_{50}$ is 3.1 gm./kg. in rats and 2.7 gm./kg. in mice; and the oral LD$_{50}$ is 6.4 gm./kg. in rats and 2.6 gm./kg. in mice.

The compounds of Formula I may be administered orally, intraperitoneally or intravenously and depending on the chosen route of administration, may be processed into convenient dosage unit forms. A practical pharmaceutical composition is an injectable simply prepared as an aqueous solution. Such solutions can be prepared to a concentration of 0.1 to 10.0% since the compounds are extremely soluble in water. For oral dosage forms, the compounds may be tableted in the usual fashion, using standard procedures, fillers, lubricating agents, granulating agents, coloring agents and/or flavoring agents.

Instead of tablets, an oral dosage form may be prepared in the form of a suspension or, ultimately, in the form of pills, wafers, chewables or a syrup. When preparing tablets, a convenient and practical dosage unit is between 0.1 and 1.0 g./tablet for human application where a convenient and efficient daily dosage is preferably chosen between 0.1 and 8 g./patient. If desired, tablets of this nature can be prepared in slow release form by enterically coating the tablets or by embedding the active compound in a slow-release medium.

We claim:

1. The process of increasing urinary excretion in warm-blooded animals in need thereof consisting essentially in administering to said animal a therapeutically effective dose of a compound of the formula

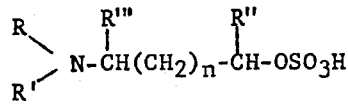

wherein R, R', R'' and R''' independently are hydrogen or methyl and $n$ is 0, 1 or 2.

2. The process of claim 1 wherein R, R', R'' and R''' are hydrogen and $n$ is 0–1.

3. The process of claim 2 wherein $n$ is 0.

4. The process of claim 2 wherein $n$ is 1.

5. The process of claim 2 wherein $n$ is 2.

6. The process of claim 1 wherein R, R' and R'' are hydrogen, R''' is methyl and $n$ is 0.

7. The process of claim 1 wherein said dose is administered in unit dosage form.

8. The process of claim 7 wherein said dose is administered orally in the form of a solid pharmaceutical dosage unit form.

9. A medicinal composition in dosage unit form designed to increase urinary excretion consisting essentially of a pharmaceutically effective amount of a compound of the formula

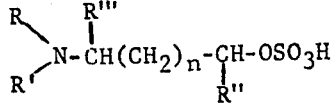

wherein R, R', R'' and R''' independently are hydrogen or methyl together with a solid pharmaceutical carrier and $n$ is 0–2.

10. The composition of claim 9 wherein R, R', R'' and R''' are hydrogen and $n = 0$.

* * * * *